United States Patent
Pedersen et al.

(10) Patent No.: US 11,378,278 B2
(45) Date of Patent: Jul. 5, 2022

(54) SYSTEM AND PROCESS FOR EFFICIENT SCR AT HIGH $NO_2$ TO $NO_x$ RATIOS

(71) Applicant: Umicore AG & Co. KG, Hanau-Wolfgang (DE)

(72) Inventors: Kim Hougaard Pedersen, Virum (DK); Wayne S. Jones, Houston, TX (US); David Taylor, Houston, TX (US)

(73) Assignee: Umicore AG & Co. KG, Hanau-Wolfgang (DE)

(*) Notice: Subject to any disclaimer, the term of this patent is extended or adjusted under 35 U.S.C. 154(b) by 319 days.

(21) Appl. No.: 16/709,954

(22) Filed: Dec. 11, 2019

(65) Prior Publication Data

US 2021/0180791 A1   Jun. 17, 2021

(51) Int. Cl.
*B01D 53/86* (2006.01)
*B01D 53/90* (2006.01)
*F23R 3/40* (2006.01)

(52) U.S. Cl.
CPC .............. *F23R 3/40* (2013.01); *B01D 53/865* (2013.01); *B01D 53/869* (2013.01);
(Continued)

(58) Field of Classification Search
CPC ................ B01D 53/925; B01D 53/927; B01D 53/9418; B01D 53/9422; B01D 53/9431;
(Continued)

(56) References Cited

U.S. PATENT DOCUMENTS 8,790,609 B1    7/2014 Sobolevskiy
10,267,197 B2 *  4/2019 Nilsson .................. F01N 3/023
(Continued)

FOREIGN PATENT DOCUMENTS

WO    2014124830    8/2014

OTHER PUBLICATIONS

International Search Report received in PCT/EP2020/083868, dated Mar. 19, 2021.
(Continued)

*Primary Examiner* — Timothy C Vanoy
(74) *Attorney, Agent, or Firm* — Suzannah K. Sundby, Esq.; Canady + Lortz LLP

(57) ABSTRACT

Disclosed herein are methods and systems for the removal of volatile organic compounds, carbon monoxide and nitrogen oxides from off-gas, which systems comprise a source of ammonia, means for introducing ammonia into a catalytic article having an SCR functionality; a catalytic article having both an oxidation and an SCR functionality, the catalytic article comprising a catalyst substrate and a catalyst composition comprising at least one platinum group metal and/or at least one platinum group metal oxide, at least one oxide of titanium and at least one oxide of vanadium, wherein the washcoat is located in and/or on the walls of the catalyst substrate: means for measuring the amount of $NO_x$ and/or the ammonia slip between the outlet end of the catalytic article and the stack or at the stack, at least one carbon monoxide source, and means for introducing carbon monoxide into the catalytic article.

20 Claims, 5 Drawing Sheets

(52) U.S. Cl.
CPC ..... *B01D 53/8653* (2013.01); *B01D 53/8687* (2013.01); *B01D 53/90* (2013.01); *B01D 2255/1021* (2013.01); *B01D 2255/20707* (2013.01); *B01D 2255/20723* (2013.01); *B01D 2255/40* (2013.01); *B01D 2257/406* (2013.01); *B01D 2257/502* (2013.01)

(58) Field of Classification Search
CPC .......... B01D 53/9459; B01D 2257/404; B01D 2257/502; B01D 2257/702; B01D 2258/012; F01N 3/103; F01N 3/105; F01N 3/2066; F01N 2560/026; F01N 2570/10; F01N 2570/12; F01N 2570/14; F23R 3/40
See application file for complete search history.

(56) References Cited

U.S. PATENT DOCUMENTS

| | | | |
|---|---|---|---|
| 2007/0110643 | A1 | 5/2007 | Sobolevskiy |
| 2012/0258015 | A1* | 10/2012 | Ren ................... B01D 53/9477 422/171 |
| 2015/0336051 | A1 | 11/2015 | Bruckner |
| 2017/0292430 | A1* | 10/2017 | Clayton, Jr. ....... B01D 53/9495 |

OTHER PUBLICATIONS

Written Opinion received in PCT/EP2020/083868, dated Mar. 19, 2021.

* cited by examiner

SYSTEM AND PROCESS FOR EFFICIENT SCR AT HIGH NO₂ TO NOₓ RATIOS

Disclosed herein is a system for the removal of volatile organic compounds, carbon monoxide and nitrogen oxides from off-gas even at high $NO_2$ to $NO_x$ ratios, wherein the amount of $NO_2$ within $NO_x$ is higher than or equal to 50 mol-%, comprising a source of ammonia, means for introducing ammonia into a catalytic article having an SCR functionality; a catalytic article having both an oxidation and an SCR functionality, the catalytic article comprising a catalyst substrate and a catalyst composition comprising at least one platinum group metal and/or at least one platinum group metal oxide, at least one oxide of titanium and at least one oxide of vanadium, wherein the washcoat is located in and/or on the walls of the catalyst substrate: means for measuring the amount of $NO_x$ and/or the ammonia slip between the outlet end of the catalytic article and the stack or at the stack, at least one carbon monoxide source, and means for introducing carbon monoxide into the catalytic article. Optionally, an SCR catalytic article can be placed upstream of downstream of the catalytic article having both an oxidation and an SCR functionality. Also disclosed is a method for the removal of volatile organic compounds, carbon monoxide and nitrogen oxides from off-gas introducing carbon monoxide in order to keep the amount of $NO_x$ and/or the ammonia slip between the outlet end of the catalytic article and the stack or at the stack at predetermined values. The method makes use of the system according to the invention. The system and the method can be used for the cleaning of flue gas.

The present invention relates to a system for the oxidation of volatile organic compounds and carbon monoxide to carbon dioxide and water, and for the reduction of nitrogen oxides to nitrogen and water even at high $NO_2$ to $NO_x$ ratios. Furthermore, the present invention provides a method for the removal of volatile organic compounds and nitrogen oxides from off-gas. The system and the method for removing volatile organic compounds and nitrogen oxides from off-gas is particularly useful for the cleaning of flue gas released during the combustion of fossil fuels, for instance by gas turbines used in power generation, or by nitric acid plants.

Problem to be Solved by the Invention

The flue gas cleaning system of modern power plants is typically equipped with an oxidation catalyst for the removal of volatile organic compounds (VOC) and carbon monoxide (CO), and furthermore with a reduction catalyst for the selective catalytic reduction (SCR) of nitrogen oxides ($NO_x$).

Removal of $NO_x$, VOC and CO from combustion turbine exhaust gas is conventionally accomplished with the use of two different catalyst compositions. The catalyst for oxidation of CO and VOCs is usually arranged upstream of the catalyst for $NO_x$ removal with the injection of ammonia taking place between the two layers of catalyst.

Hereinafter, the terms "flue gas" and "exhaust gas" are used synonymously.

Selective catalytic reduction (SCR) is a catalytic reaction of nitrogen oxides, NO and $NO_2$, with ammonia to form elemental nitrogen and water according to the reaction schemes below:

$$4NO + 4NH_3 + O_2 \rightarrow 4N_2 + 6H_2O \quad (1)$$

$$NO + NO_2 + 2NH_3 \rightarrow 2N_2 + 3H_2O \quad (2)$$

$$6NO_2 + 8NH_3 \rightarrow 7N_2 + 12H_2O \quad (3)$$

$$2NO_2 + 4NH_3 + O_2 \rightarrow 3N_2 + 6H_2O \quad (4)$$

Reactions 1 and 2 are the predominant ones with one mole of ammonia consumed per each mole of $NO_x$ converted. Reactions 3 and 4 occur in gases where a large fraction of the $NO_x$ is present as $NO_2$. To allow the reactions to occur at temperatures of 150 to 480° C. (300 to 900° F.), a catalyst is used. The most common SCR catalyst type is based on vanadium pentoxide ($V_2O_5$) as the active compound on a titanium dioxide ($TiO_2$) carrier system.

Reaction 1 is known as the "standard SCR reaction", reaction 2 is the "fast SCR reaction", and reactions 3 and 4 are the "$NO_2$ SCR reaction".

However, SCR kinetics are significantly reduced if the fraction of $NO_2$ in the off-gas exceeds 50% of the total $NO_x$. This has a huge impact on flue gas cleaning, particularly in gas turbines used in power generation, where the $NO_2$ to $NO_x$ molar ratio can exceed 90%, for instance during start-up, thus giving rise to very poor performance of the existing vanadium-based SCR catalyst technology that is commonly used. The problem may also occur in nitric acid production where $NO_x$ in off-gases may also contain high levels of $NO_2$.

The prior art describes catalytic devices which combine catalysts for the oxidation of carbon monoxide and volatile organic compounds with catalysts for the selective catalytic reduction of nitrogen oxides.

WO 2014/063738 A1 discloses a method for cleaning a sulphur dioxide containing off-gas by selective oxidation of carbon monoxide and volatile organic compounds in the off-gas with reduced formation of sulphur trioxide comprising the step of contacting the off-gas with an oxidation catalyst consisting of palladium and vanadium oxide supported on a carrier. If the off-gas additionally comprises nitrogen oxides, said off-gas is brought into contact with a catalyst being effective in the selective reduction prior or subsequent to bringing it into contact with the vanadium oxide and palladium containing oxidation catalyst.

WO 2014/124830 A1 discloses a method and a catalyst where the flue gas or exhaust gas containing harmful carbon monoxide, organic volatile compounds and $NO_x$ is contacted with a layered catalyst in which a first layer comprises an oxidation catalyst an in an underlying layer an ammonia-SCR catalyst ($NH_3$—SCR catalyst) for the simultaneous removal of the carbon monoxide and $NO_x$.

WO 2017/220473 A1 discloses a method for the preparation of a monolithic catalyst for the reduction of nitrogen oxides, volatile organic compounds and carbon monoxides in an off-gas. The catalyst comprises at least one platinum group metal, vanadium oxide, titania and optionally tungsten oxide. The problem solved by this method is that it avoids the formation of platinum group metal concentration gradients over the whole axial and vertical length of the substrate. The formation of gradients is particularly problematic if a substrate is preloaded with vanadium oxide and then impregnated with a platinum group metal. Due to the strong and fast adsorption of the platinum group metals on vanadium oxide in the catalyst substrate, it is necessary to impregnate the catalyst substrate with excess amounts of palladium and/or platinum in order to obtain a minimum load in the center of the substrate. Concentration gradients across the thickness of the washcoat layer and along the channels of a substrate monolith are disadvantageous because the catalytic activity in the SCR reaction and the CO and VOC oxidation is dependent on the platinum group metal concentration on the catalytically active surface of the coated substrate.

In M-S Li, K Seshan and L Lefferts: "Influence of NO on the Reduction of $NO_2$ with CO over $Pt/SiO_2$ in the Presence of $O_2$", Chin J Chem 2007, 25, 435-438, the reduction of $NO_2$ with CO in the presence of NO and excess oxygen, a model mixture for flue gas, over a 0.1% $Pt/SiO_2$ catalyst was studied. The related reaction mechanisms, such as oxidation of CO and NO, were discussed. It was found that there was a narrow temperature window (180-190° C.) for the reduction of $NO_2$ by CO. When the temperature was lower than the lower limit of the window, the reduction hardly occurred, while when the temperature was higher than the upper limit of the window, the direct oxidation of CO by $O_2$ occurred and thereby $NO_2$ could not be effectively reduced by CO. The presence of NO shifted the window to higher temperatures owing to the inhibition effect of NO on the activation of $O_2$ on Pt, which made it possible to reduce $NO_2$ by CO in the flue gas.

In V A Ostapyuk, M G Martsenyuk-Kukharuk and Y I Pyatnitskii: "Reaction between $NO_2$ and CO on a palladium catalyst", Kinet Catal 1991, 32, 189-190, the reaction of CO with $NO_2$ at atmospheric pressure in a flow reactor on a catalyst of 0.5 mass % Pd on $SiO_2$ at a 0.05 liter/min flow rate of the reaction mixture was investigated. The $NO_2$ was prepared by first mixing streams of NO/helium and $O_2$ of given compositions and then passing the mixture through cooled vessels. The reaction of CO and $NO_2$ went quickly even at room temperature, and a practically complete conversion was achieved at about 100° C. Furthermore, it was shown that the reaction of CO and $NO_2$ to form $CO_2$ and NO took place at considerably lower temperatures than did the reactions of CO with $O_2$ and CO with NO.

However, none of the prior art documents known so far discusses or solves the problem of reduced SCR kinetics if the fraction of $NO_2$ in the off-gas exceeds 50 mol-% of the total $NO_x$. It is therefore an aim of the present invention to provide a system for the removal of volatile organic compounds, carbon monoxide and nitrogen oxides from off-gas even at high $NO_2$ to $NO_x$ ratios. Furthermore, it is an object of the present invention to provide a method for the removal of volatile organic compounds, carbon monoxide and nitrogen oxides from off-gas.

Solution of the Problem

The aim to provide a system for the removal of volatile organic compounds, carbon monoxide and nitrogen oxides from off-gas is solved by a system comprising
  a) a source of ammonia
  b) means for introducing ammonia into a catalytic article having an SCR functionality;
  c) a catalytic article having both an oxidation and an SCR functionality, the catalytic article comprising
     a catalyst substrate and a catalyst composition comprising at least one platinum group metal and/or at least one platinum group metal oxide, at least one oxide of titanium and at least one oxide of vanadium,
  d) means for measuring the amount of $NO_x$ and/or the ammonia slip between the outlet end of the catalytic article and the stack or at the stack,
  e) at least one carbon monoxide source,
  f) means for introducing carbon monoxide into the catalytic article.

It has surprisingly been found that the system and the method for the removal of volatile organic compounds, carbon monoxide and nitrogen oxides from off-gas according to the present invention are capable of removing nitrogen oxides from off-gas even at high $NO_2$ to $NO_x$ ratios. In the context of the present invention, a $NO_2$ to $NO_x$ ratio is considered high if the amount of $NO_2$ within $NO_x$ is higher than or equal to 50 mol-%. The system and the method according to the present invention can even be used for the removal of $NO_x$ if the amount of $NO_2$ within $NO_x$ is up to 100 mol-%.

The system for the removal of volatile organic compounds, carbon monoxide and nitrogen oxides from off-gas even at high $NO_2$ to $NO_x$ ratios and method for the removal of volatile organic compounds, carbon monoxide and nitrogen oxides from off-gas are explained below, with the invention encompassing all the embodiments indicated below, both individually and in combination with one another.

A "catalyst" or "catalyst composition" is a substance or a mixture of substances which is capable to convert one or more components of an exhaust gas into one or more other components. An example of such a catalyst is, for instance, an oxidation catalyst or an oxidation catalyst composition which is capable of converting volatile organic compounds and carbon monoxide to carbon dioxide. Another example of such a catalyst is, for example, a selective reduction catalyst (SCR catalyst) or an SCR catalyst composition which is capable of converting nitrogen oxides to nitrogen and water. In the context of the present invention, a catalytic article having an SCR functionality is a catalytic article comprising an SCR catalyst or an SCR catalyst composition.

A "catalyst substrate" is a support to which the catalyst or catalyst composition is affixed and shapes the final catalyst. The catalyst substrate is thus a carrier for the catalyst or catalyst composition.

A "catalytic article" comprises of a catalyst substrate and a catalyst or catalyst composition affixed to said catalyst substrate. The catalytic article according to the present invention is a "dual function catalyst" (DFC) because it has both an oxidation and a reduction functionality: the DFC is capable of oxidizing volatile organic compounds and carbon monoxide to carbon dioxide and water. Additionally, the DFC can reduce nitrogen oxides to nitrogen and water in the presence of ammonia. This means that the DFC also has an SCR reduction functionality.

The terms "exhaust gas", "flue gas" or "off-gas", as used in the context of the present invention refers to gases emitted as a result of the combustion of fuels such as natural gas, gasoline, petrol, biodiesel blends, diesel fuel, fuel oil, or coal.

An "unpurified" or "uncleaned" exhaust gas, flue gas or off-gas is a gas as defined above which has not yet passed through an exhaust gas purification system.

"Upstream" and "downstream" are terms relative to the normal flow direction of the off-gas in the exhaust pipeline. An "object, article or device 1 which is located upstream of an object, article or device 2" means that object 1 is positioned closer to the source of the off-gas, i.e. closer to the motor or the gas turbine. In this case, object 2 is located "downstream" of object 1, i.e. object 2 is further away from the source of the off-gas than object 2. The flow direction is from the source of the off-gas to the chimney or exhaust pipe.

The "inlet end" of a catalytic article is the end which is directed towards the combustion source, and the "outlet end" is the end directed to the stack.

The reduction of nitrogen oxides to nitrogen and water is well known as the SCR reaction, and it is also known that the SCR reaction requires ammonia. Thus, the system according to the present invention also comprises a source of ammonia and means for introducing ammonia.

The source of ammonia can be ammonia as such or an ammonia precursor which is capable of releasing ammonia. The source of ammonia is preferably selected from aqueous ammonia, anhydrous ammonia, an aqueous urea solution, an aqueous ammonium formate solution and ammonium carbamate and mixtures thereof, more preferably anhydrous ammonia or an aqueous urea solution. Anhydrous ammonia $NH_3$ can be used as a gas or a liquid. Suitable ammonia precursors are, for instance, urea, ammonium carbamate and ammonium formate, preferably urea. The precursors are hydrolyzed to ammonia upon heating. An aqueous urea solution, for instance, hydrolyses at temperatures above 130° C., thereby releasing ammonia. Off-gases of powerplants and nitric acid plants have temperatures above 130° C. when in operation, and thus, an aqueous urea solution will easily hydrolyze when introduced into an SCR catalyst within such a plant. Aqueous ammonia can also be effectively decomposed when injected as fine particles into a gas stream of at least 350° C.

The anhydrous ammonia, aqueous solution of ammonia or the ammonia precursor is stored in a container, added to the off-gas stream as needed, and it is introduced at the inlet side of the catalytic article. Containers for storing as well as means for introducing anhydrous ammonia, aqueous solutions of ammonia or an ammonia precursor at the inlet side SCR catalyst are well known in the art and can be applied to the present invention without departing from the scope of the claims. In the context of the present invention, the term "means for introducing ammonia" encompasses means for introducing ammonia as such as well as means for introducing ammonia precursors. Preferably, the container comprises anhydrous ammonia or an aqueous urea solution. A suitable means for introducing the aqueous ammonia solution or the aqueous ammonia precursor solution is via an injector located upstream, i.e. at the inlet side, of the catalytic article.

In a preferred embodiment of the present invention, the means for introducing ammonia into the off-gas is a means for introducing anhydrous ammonia.

The catalyst substrate is selected from flow-through substrates, wall-flow substrates and corrugated substrates. Wall-flow substrates and flow-through substrates may consist of inert materials, such as silicon carbide, aluminum titanate, cordierite, metal or metal alloys. The inert materials can, for instance, be extruded as such and subsequently coated with at least one washcoat comprising a catalyst composition. It is also possible to mix the inert materials for the wall-flow substrate or the flow-through substrate with the catalyst material or precursors thereof to form a paste and to extrude this mixture to obtain a catalytic article as defined above in one step. Furthermore, the substrate can be selected from ceramic candle filters, bag filters or catalyst pellets.

Such carrier substrates are well-known to the skilled person and available on the market. In a preferred embodiment, the catalyst substrate is a corrugated substrate monolith.

The corrugated substrate monolith is a paper of high silica content glass or a paper of E-glass fiber, and it is coated with the at least one washcoat.

Methods for preparing washcoats, for applying them onto catalyst substrates, and also methods for making extruded catalytic articles are well-known to the skilled person. They can be applied in the context of the present invention without departing from the scope of the claims.

The catalyst or catalyst composition is located in and/or on the walls of the catalyst substrate. Preferably, the catalyst or catalyst composition is located in the walls of the catalyst substrate.

The catalyst or catalyst composition of the catalytic article having both an oxidation and an SCR functionality comprises at least one platinum group metal and/or at least one platinum group metal oxide, at least one oxide of titanium and at least one oxide of vanadium.

The at least one platinum group metal and/or at least one platinum group metal oxide is selected from ruthenium, rhodium, palladium, osmium, iridium, platinum and the oxides thereof. If more than one platinum group metal is present, it can deal with physical mixtures, alloys, or mixtures of physical mixtures and alloys of the platinum group metals and/or their oxides. If, for instance, platinum and palladium are chosen, they can be present as a) a physical mixture, b) an alloy of platinum and palladium wherein neither pure platinum or pure palladium are present, or c) an alloy of platinum and palladium as described under b) and additionally pure platinum and/or pure palladium. If oxides of more than one platinum group metal are present, they can be present as a) mixtures of oxides of the same metal in various oxidation states, b) mixtures of oxides of different metals in one or more oxidation states, c) oxides of alloys or d) combinations of mixtures of oxides of one or more metals in various oxidation states and mixtures of oxides of different metals. Furthermore, the platinum group metals and platinum group metal oxides as listed above can be present concomitantly.

Preferably, the at least one platinum group metal is selected from palladium, platinum, iridium and mixtures, alloys, oxides and mixtures of alloys, oxides and physical mixtures. Even more preferably, the at least one platinum group metal is palladium and/or palla-dium(II) oxide PdO.

In a preferred embodiment, the catalyst substrate is a corrugated substrate, and the catalyst or catalyst composition is located in and/or on the walls of the catalyst substrate as described above. In this embodiment, the total weight of the catalytic article is the sum of the amounts of the at least one platinum group metal and/or at least one platinum group metal oxide, the amount of the at least one oxide of titanium, the amount of the at least one oxide of vanadium and the amount resp. the weight of the catalyst substrate. The amounts of the at least one platinum group metal and/or at least one platinum group metal oxide, the amount of the at least one oxide of titanium and the amount of the at least one oxide of vanadium of this embodiment are given hereinafter.

The at least one platinum group metal and/or platinum group metal oxide is present in the catalytic article in an amount of 50 to 10000 ppmw, preferably 200 to 3000 ppmw, even more preferably 400 to 1500 ppmw, calculated as the pure precious metal and based on the total weight of the catalytic article. The unit "ppmw" stands for "part per million per weight". Preferably, the at least one platinum group metal is palladium.

The at least one oxide of titanium in the catalytic article is present in an amount of 60 to 90 wt.-%, preferably 65 to 85 wt.-%, and more preferably 70 to 80 wt.-%, calculated as $TiO_2$ and based on the total weight of the catalytic article. In one embodiment, the at least one oxide of titanium is titanium dioxide ($TiO_2$). Suitable titanium dioxides comprise at least 95 wt.-% of anatase, preferably at least 98 wt.-%, and even more preferably at least 99.5 wt.-%. The remainder for adding up to 100 wt.-% of $TiO_2$ is represented by rutile and/or brookit, preferably by rutile. The at least one oxide of titanium serves as the washcoat carrier.

The at least one oxide of vanadium is present in an amount of 0.1 to 17 wt.-%, preferably 0.6 to 5 wt.-%, more preferably 1.8 to 3.6 wt.-%, calculated as $V_2O_5$ and based on the total weight of the catalytic article. In one embodiment, the at least one oxide of vanadium is vanadium pentoxide ($V_2O_5$).

In one embodiment, the first washcoat additionally comprises at least one oxide of tungsten. The at least one oxide of tungsten is present in an amount of 0.001 to 10 wt.-%, preferably 2 to 7 wt.-%, more preferably 2.5 to 6 wt.-% and most preferably 2.7 to 3.3 wt.-%, calculated as $WO_3$ and based on the total weight of the catalytic substrate. In one embodiment, the at least one oxide of tungsten is tungsten trioxide ($WO_3$). In this embodiment, the total weight of the catalytic article is the sum of the amounts of the at least one platinum group metal and/or at least one platinum group metal oxide, the amount of the at least one oxide of titanium, the amount of the at least one oxide of vanadium, the amount of the at least one oxide of tungsten and the amount resp. the weight of the catalyst substrate.

The amount of $NO_x$ and/or the ammonia slip can be measured between the outlet end of the catalytic article and the stack or at the stack of the off-gas cleaning system in order to control the efficiency of the off-gas cleaning. In all embodiments of the present invention, the amount of $NO_x$ and/or the ammonia slip are preferably measured at the stack.

The respective amount of $NO_x$ can be determined, for instance, by a chemiluminescence detector (CLD), Fourier transform infrared spectroscopy (FTIR), or infrared spectroscopy (IR). These means to determine the amount of $NO_x$ are well known to the skilled artisan and can be applied in the present invention without departing from the scope of the claims.

As an alternative to the measurement of the amount of $NO_x$ as described above, it is also possible to measure the ammonia slip ($NH_3$ slip) between the outlet end of the catalytic article and the stack or at the stack of the off-gas cleaning system. Ammonia exhausted at the stack of an off-gas cleaning system is known as "ammonia slip". The ammonia slip is usually measured by FTIR. The measurement of the ammonia slip can take place in addition or as an alternative to the measurement of the amount of $NO_x$ between the outlet end of the catalytic article and the stack or at the stack.

Optionally, it is also possible to measure the amount of CO emitted between the outlet end of the catalytic article and the stack or at the stack. This measurement can take place in addition to the measurement of the amount of $NO_x$ and/or the $NH_3$ slip between the outlet end of the catalytic article and the stack or at the stack. A suitable means for the measurement of CO is, for instance, the non-dispersive infrared analyzer (NDIR). Means and methods for measuring CO are well-known to the skilled person and can be applied in the context of the present invention without departing from the scope of the claims. As described above for the measurement of the amount of $NO_x$ and/or the ammonia slip, the measurement of CO also preferably takes place at the stack.

In one embodiment of the present invention, the DFC is the only catalytic article having an SCR function in the system for the removal of volatile organic compounds, carbon monoxide and nitrogen oxides. In this embodiment, the means for introducing ammonia are located directly upstream of said catalytic article, and the means for measuring the amount of $NO_x$ and/or the ammonia slip, and optionally also the means for measuring the CO emitted, are located between the outlet end of the DFC and the stack or at the stack, preferably at the stack.

In another embodiment of the present invention, an SCR catalytic article is present upstream of the DFC. By contrast to the DFC, said SCR catalytic article only has a selective catalytic reduction functionality, but no oxidation functionality. In case of an SCR catalytic article upstream of the DFC, the means for introducing ammonia are located directly upstream of the SCR catalytic article. This means that the SCR catalytic article is located between the means for introducing ammonia according to b) and the DFC according c) as defined above. In this embodiment, the means for measuring the amount of $NO_x$ and/or the ammonia slip, and optionally also the means for measuring the CO emitted, are also located between the outlet end of the DFC and the stack or at the stack, preferably at the stack.

In yet another embodiment of the present invention, an SCR catalytic article is present downstream of the DFC. In case of an SCR catalytic article downstream of the DFC, the means for introducing ammonia are located directly upstream of the SCR catalytic article. In this embodiment, the means for introducing ammonia according to b) are either located upstream the DFC or between the DFC and the SCR catalytic article. In this embodiment, the means for measuring the amount of $NO_x$ and/or the ammonia slip, and optionally also the means for measuring the CO emitted, are located between the outlet end of the SCR catalytic article and the stack or at the stack, preferably at the stack.

The term "the means for measuring the amount of $NO_x$ and/or the ammonia slip, and optionally also the means for measuring the CO emitted, are located between the outlet end of the catalytic article and the stack" means that these means for measuring are located downstream of the catalytic article having an SCR catalytic function which is located closest to the stack.

If the catalytic article having an SCR catalytic function which is located closest to the stack is the DFC, and the means for measuring the amount of $NO_x$ and/or the ammonia slip, and optionally also the means for measuring the CO emitted, are located between the outlet end of the SCR catalytic article and the stack, then said means for measuring are located downstream of the DFC and upstream of the stack. This arrangement applies both for the embodiment wherein the DFC is the only catalytic article having an SCR catalytic function and also for the embodiment where an SCR catalytic article is located upstream the DFC as described above.

If, however, an SCR catalytic article is located downstream the DFC and the means for measuring the amount of $NO_x$ and/or the ammonia slip, and optionally also the means for measuring the CO emitted, are located between the outlet end of the SCR catalytic article and the stack, then the term "located between the outlet end of the SCR catalytic article and the stack" refers to the SCR catalytic article having only a selective catalytic reduction functionality, but no oxidation functionality.

SCR catalytic articles are known to the skilled person and can be used in the context of the present invention without departing from the scope of the claims. SCR catalytic articles as known in the art may comprise zeolites or metal oxides or a mixture of zeolites and metal oxides as SCR catalysts or catalyst compositions.

Suitable zeolites are, for instance, small-pore aluminosilicate zeolites, selected from ACO, AEI, AEN, AFN, AFT, AFX, ANA, APC, APD, ATT, BIK, CDO, CHA, DDR, DFT, EAB, EDI, EPI, ERI, ESV, ETL, GIS, GOO, IHW, ITE, ITW, LEV, KFI, MER, MON, NSI, OWE, PAU, PHI, RHO, RTH, SAT, SAV, SIV, THO, TSC, UEI, UFI, VNI, YUG, ZON and mixtures and intergrowths thereof. Preferably, the zeolites are chosen from AEI, AFT, AFX, CHA, DDR, ERI, ESV, ETL, KFI, LEV, UFI and mixtures and intergrowths thereof, and even more preferably, the zeolites are chosen from AEI, CHA, AFX. Furthermore, the small-pore zeolites comprise 0.1 to 10 wt.-% of a transition metal, calculated as the respective transition metal oxide and based on the total weight of the zeolite. Preferably, the transition metal is chosen from Fe, Cu and mixtures thereof, more preferably, the transition metal is copper. Furthermore, the zeolites comprise at least one alkali and/or alkaline earth metal in a concentration of up to 2 wt.-%, calculated as the respective metals and based on the total weight of the zeolites. The alkali and alkaline earth metals are chosen from lithium, sodium, potassium, rubidium, caesium, magnesium, calcium, strontium, barium and mixtures thereof. Preferably, the alkali and/or alkaline earth metals are chosen from sodium, potassium, and mixtures thereof.

Suitable metal oxides that can be used as SCR catalyst compositions are, for example, mixtures of oxides of titania and vanadia as described above for the DFC. Optionally, they may additionally comprise other oxides such as tungsten oxides, antimony oxides, niobium oxides, molybdenum oxides, cerium oxides, lanthanum oxides and mixtures thereof.

As used in the present invention, the term "nitrogen oxides", also written as $NO_x$, refers to the entirety of nitrogen monoxide (NO) and nitrogen dioxide ($NO_2$) which are present in the exhaust gas or off-gas, irrespective of the relative amounts of NO and $NO_2$, respectively, in said exhaust gas or off-gas.

The $NO_2$ to $NO_x$ ratio of an exhaust gas or off-gas can be calculated according to the following formula:

$$x\ [NO_2] = \frac{[NO_2]}{[NO]+[NO_2]} \times 100 \quad (5)$$

Wherein
[NO]=amount of nitrogen oxide [mol]
[$NO_2$]=amount of nitrogen dioxide [mol]
[$NO_x$]=[NO]+[$NO_2$]
x=percent.

X can be a real number between 0 and 100.
X=0% means that the $NO_x$ consist of NO only, whereas x=100% means that the $NO_x$ consist of $NO_2$ only.

In the context of the present invention, a "high" $NO_2$ to $NO_x$ ratio is given if x [$NO_2$] is larger than 50 mol-%.

As mentioned above, SCR kinetics are significantly reduced if the fraction of $NO_2$ in the off-gas exceeds 50 mol-%, more at 60% and even more at 70%, 80% or 90% of the total $NO_x$, and this can give rise to a very poor performance of vanadium-based SCR catalysts.

In particular during the start-up of gas turbines, i.e. during low load or during load changes, where high ratios of $NO_2$ to $NO_x$ occur, a significant amount of carbon monoxide is also formed due to an incomplete combustion process. It is known that carbon monoxide can reduce nitrogen dioxide according to the formula

$$NO_2 + CO \rightarrow NO + CO_2 \quad (6)$$

It has surprisingly been found that a high level of CO increases the SCR kinetics on the DFC under high $NO_2$ to $NO_x$ ratios. This is explained by the fact that $NO_2$ is reduced to NO and thus, the $NO_2$ to $NO_x$ ratio drops below 50 mol-%, which is optimal for the SCR reaction.

The catalytic article according to the present invention, which is both active in the oxidation of volatile organic compounds and carbon monoxide to carbon dioxide and water, and which is also active in the reduction of nitrogen oxides to nitrogen and water, shows a constantly high activity when fed with carbon monoxide in order to keep the $NO_2$ to $NO_x$ ratio below 90 mol-%, preferably below 80 mol-%, 70 mol-%, 60 mol-% and even more preferably below 50 mol-%.

The at least one carbon monoxide source may come from the uncleaned exhaust gas released by a power plant, e.g. by a gas turbine, because the unpurified exhaust gas comprises carbon monoxide and/or volatile organic compounds (VOC). The VOC can release carbon monoxide. Alternatively or additionally, hydrocarbons, VOC and/or CO can be added to the exhaust gas from external sources. An "external source" is meant as injecting, for instance, natural gas or fuel which will release CO upon incomplete combustion, or by adding CO gas which does not originate from the uncleaned exhaust gas released by a power plant, into the catalytic article. Thus, the at least one carbon monoxide source is selected from unpurified exhaust gas, natural gas, fuel, carbon monoxide gas which does not originate from unpurified exhaust gas, volatile organic compounds and mixtures thereof. The carbon monoxide is introduced into the catalytic article at the inlet side.

In case the carbon monoxide source is uncleaned exhaust gas released by a power plant or VOC which is present in the power plant, then the power plant itself is the means for introducing carbon monoxide.

In case of "external sources" of CO, the means for introducing carbon monoxide is an injector, a sprayer or a nozzle.

The aim to provide a method for the removal of volatile organic compounds, carbon monoxide and nitrogen oxides from off-gas is solved by a method comprising the steps of
a) introducing ammonia into the off-gas,
b) introducing the off-gas into a catalytic article having both an oxidation and a reduction functionality, the catalytic article comprising
a catalyst substrate and a catalyst composition comprising at least one platinum group metal and/or at least one platinum group metal oxide, at least one oxide of titanium and at least one oxide of vanadium,
c) measuring the amount of $NO_x$ and/or the ammonia slip between the outlet end of the catalytic article and the stack or at the stack,
d) introducing carbon monoxide into the catalytic article to decrease the amount of $NO_x$ and/or the ammonia slip in the stack measured under step c)
e) measuring the amount of $NO_x$ and/or the ammonia slip between the outlet end of the catalytic article and the stack or at the stack after the introduction of carbon monoxide.

Sources of ammonia and means for introducing ammonia are described above.

In one embodiment, the source of ammonia to be injected in step a) of the method according to the present invention is selected from aqueous ammonia, anhydrous ammonia, an aqueous urea solution, an aqueous ammonium formate solution and ammonium carbamate. Preferably, it is selected from anhydrous ammonia or aqueous urea solution. The precursors are hydrolyzed to ammonia upon heating as described above.

Containers for storing the ammonia or ammonia precursor as well as means for introducing ammonia are described above.

In a preferred embodiment of the method according to the present invention, the ammonia introduced into the off-gas according to step a) is anhydrous ammonia.

In step b) of the method according to the present invention, the off-gas is introduced into a catalytic article as described above.

As described above, in one embodiment of the present invention, the DFC is the only catalytic article having an SCR function in the system for the removal of volatile organic compounds, carbon monoxide and nitrogen oxides. In this embodiment, ammonia is introduced directly upstream of said catalytic article, and the means for measuring the amount of $NO_x$ and/or the ammonia slip, and optionally also the means for measuring the CO emitted, are located between the outlet end of the DOC and the stack or at the stack, preferably at the stack.

In another embodiment of the present invention, an SCR catalytic article is present upstream the DFC. By contrast to the DFC, said SCR catalytic article only has a selective catalytic reduction functionality, but no oxidation functionality. In case of an SCR catalytic article upstream the DFC, ammonia is introduced directly upstream the SCR catalytic article. This means that the SCR catalytic article is located between the means for introducing ammonia and the DFC as defined above. In this embodiment, the means for measuring the amount of $NO_x$ and/or the ammonia slip, and optionally also the means for measuring the CO emitted, are also located between the outlet end of the DOC and the stack or at the stack, preferably at the stack.

In yet another embodiment of the present invention, an SCR catalytic article is present downstream the DFC. In case of an SCR catalytic article downstream the DFC, the ammonia is introduced directly upstream the SCR catalytic article. In this embodiment, the means for introducing ammonia according to b) are either located upstream the DFC or between the DFC and the SCR catalytic article. In this embodiment, the means for measuring the amount of $NO_x$ and/or the ammonia slip, and optionally also the means for measuring the CO emitted, are located between the outlet end of the SCR catalytic article and the stack or at the stack, preferably at the stack.

In one embodiment, the catalyst substrate is selected from flow-through substrates, wall-flow substrates and corrugated substrates. Furthermore, the substrate can be selected from ceramic candle filters, bag filters or catalyst pellets. Preferably, the catalyst substrate is a corrugated substrate. The catalyst or catalyst compositions and their loadings are the same as described above.

Methods and means for measuring the amount of $NO_x$ and/or the ammonia slip are described above. They can be applied in steps c) and e) of the method according to the present invention.

Optionally, it is also possible to measure the amount of CO emitted between the outlet end of the catalytic article and the stack or at the stack. Means and methods for measuring CO have been described above. They can be applied in steps c) and e) of the method according to the present invention. The measurement of CO can take place in addition to the measurement of the amount of $NO_x$ and/or the $NH_3$ slip between the outlet end of the catalytic article and the stack or at the stack.

Measuring the amount of $NO_x$ and/or the ammonia slip, and optionally also measuring the amount of CO emitted "between the outlet end of the catalytic article and the stack" ahs the same meaning as defined above for the embodiments of the system wherein either the DFC is the only catalytic article having an SCR catalytic function, or wherein an additional SCR catalytic article is located either upstream or downstream of the DFC.

Sources of carbon monoxide and means for introducing it are described above and can be applied in step d) of the method according to the present invention. The carbon monoxide is introduced into the catalytic article in an amount that decreases the amount of $NO_x$ and/or the ammonia slip between the outlet end of the catalytic article and the stack or at the stack measured under step c).

In the selective catalytic reduction, the standard and the fast SCR reaction as defined in reactions 1 and 2 above are preferred. Both require stoichiometric amounts of $NH_3$ compared to the amount of NO (reaction 1) or the sum of the amounts of NO and $NO_2$, respectively. By contrast, the $NO_2$ SCR reaction requires an over stoichiometric amounts of $NH_3$ compared to the amount of $NO_2$, see reaction 3. The standard SCR reaction is the fasted reaction among those three, followed by the fast SCR reaction, and the $NO_2$ SCR reaction is the slowest one.

During the cleaning of off-gas, ammonia is introduced into a catalytic article having an SCR function as described above. $NO_x$ and/or ammonia that has not reacted are usually measured between the outlet end of the catalytic article and the stack or at the stack. Ammonia that has not reacted and that is released at the stack is called "ammonia slip".

The amount of ammonia introduced into a catalytic article having an SCR function can be adjusted in order to optimize the $NO_x$ conversion of the off-gas. If the amount of $NO_2$ within the $NO_x$ increases, more ammonia can be introduced in order to convert as much $NO_x$ as possible into $N_2$ and $H_2O$. If, however, too much ammonia is introduced and/or the rather slow $NO_2$ SCR reaction dominates, it may happen that a part of the ammonia leaves the exhaust purification system in unamended form, leading to an increased ammonia slip. In case of a predominant $NO_2$ SCR reaction, the ammonia slip may rise because it cannot react sufficiently fast with the $NO_x$, because the then predominant $NO_2$ SCR reaction is too slow to convert all ammonia and $NO_2$ into $N_2$ and $H_2O$ before they reach the stack. In this case, the amount of $NO_x$ and the ammonia slip at the stack will rise, and introducing even more ammonia into the exhaust purification system will not mitigate this problem because the slow $NO_2$ SCR reaction dominates.

The method according to the present invention provides a remedy for this problem:

The amount of $NO_x$ and/or the ammonia slip are measured between the outlet end of the catalytic article and the stack or at the stack. If at least one of these amounts is too high, carbon monoxide is introduced into the exhaust purification system. It reduces part of the $NO_2$ to NO, thus the standard and/or the fast SCR reaction become dominant, and the ammonia slip and the emission of $NO_x$ at the stack decrease. This can be measured according to step e) of the method according to the present invention.

The measurement of the ammonia slip and/or the $NO_x$ emission between the outlet end of the catalytic article and the stack or at the stack according to steps c) and e) of the method according to the present invention can be measured continuously or in intervals.

The threshold values for the ammonia slip and the $NO_x$ emission between the outlet end of the catalytic article and the stack or at the stack, respectively, depend on the respective exhaust purification system and also on the legislation.

In one embodiment, the $NH_3$ slip is kept at a value of lower than or equal to 30 ppm, 29 ppm, 28 ppm, 27 ppm, 26 ppm, 25 ppm, 24 ppm, 23 ppm, 22 ppm, 21 ppm, 19 ppm, 18 ppm, 17 ppm, 16 ppm, 15 ppm, 14 ppm, 13 ppm, 12 ppm, 11 ppm, 10 ppm, 9 ppm, 8 ppm, 7 ppm, 6 ppm, 5 ppm, 4 ppm, 3 ppm, 2 ppm, 1 ppm, 0.5 ppm or 0.1 ppm.

Keeping the $NH_3$ slip and/or the amount of $NO_x$ between the outlet end of the catalytic article and the stack or at the stack at or below threshold values is achieved by injecting carbon monoxide, as explained above.

The injection can take place continuously or in intervals under the prerequisite that the amounts of $NO_x$ emitted between the outlet end of the catalytic article and the stack or at the stack and/or the ammonia slip are kept at or below the threshold values. A carbon monoxide injection in intervals can be carried out, for instance, by injecting carbon monoxide only if the amount of $NO_x$ has risen above predetermined threshold. This threshold can be, for instance, the value of higher than or equal to 2.5 ppm, preferably lower than or equal to 2.0 ppm, and even more preferably lower than or equal to 1.8 ppm as given above.

Alternatively, the carbon monoxide injection in intervals can also be carried out in predetermined time intervals and/or in order to keep the amount of $NO_x$ emitted between the outlet end of the catalytic article and the stack or at the stack at a value of lower than or equal to 30 ppm as described above. Thus, the following options for injecting the CO in intervals are possible:

1. injecting CO in order to keep the amount of $NO_x$ emitted between the outlet end of the catalytic article and the stack or at the stack at a value of lower than or equal to 300 ppm, 250 ppm, 200 ppm, 150 ppm, 100 ppm, 50 ppm, 25 ppm, 24 ppm, 23 ppm, 22 ppm, 21 ppm, 19 ppm, 18 ppm, 17 ppm, 16 ppm, 15 ppm, 14 ppm, 13 ppm, 12 ppm, 11 ppm, 10 ppm, 9 ppm, 8 ppm, 7 ppm, 6 ppm, 5 ppm, 4 ppm, 3 ppm, 2 ppm, 1 ppm, 0.5 ppm or 0.1 ppm; or
2. injecting CO in order to keep the $NH_3$ slip at a value of lower than or equal to 30, 29, 28, 27, 26, 25, 24, 23, 22, 21, 20, 19, 18, 17, 16, 15, 16, 14, 13, 12, 11, 10, 9, 8, 7, 6, 5, 4, 3, 2, 1, 0.5 Or 0.1 ppm,
3. injecting CO at predetermined time intervals.

Option 1 or 2 are particularly applicable if it is not already known by prior empirical data during which time intervals the amount of $NO_x$ emitted between the outlet end of the catalytic article and the stack or at the stack and/or $NH_3$ slip will fall below a specific threshold value, wherein the threshold value can be freely selected between 30 ppm and/or below 20 ppm $NH_3$ slip as described above.

Analogously, option 3 is particularly applicable if it is already known by prior empirical data during which time intervals the $NH_3$ slip and/or the amount of the $NO_x$ will rise above a specific threshold value, wherein the threshold value can be freely selected between and 1 ppm $NH_3$ slip or 30 and 1 ppm $NO_x$ as described above.

Within the scope of the present invention, it is possible to measure either only the amount of $NO_x$ emitted between the outlet end of the catalytic article and the stack or at the stack or only the $NH_3$ slip, or to measure both. Preferably, the $NH_3$ slip is measured, either in combination with the amount of $NO_x$ or alone.

In case of an injection of CO in intervals, the amount of CO injected is 0 ppm during the period of time when no injection takes place, and it is larger than 0 ppm when the injection takes place.

The preferred ranges for the amount of CO to be applied are given above, and these ranges apply for both the continuous injection of CO and the injection of CO in intervals during the period of time when the injection takes place.

Optionally, the method according to the present invention includes measuring the amount of carbon monoxide present in the catalytic article and/or the amount of carbon monoxide introduced into the catalytic article. It is suitable to measure the carbon monoxide amount by NDIR (non-dispersive infra-red). The skilled person knows how to measure carbon monoxide and can apply this knowledge without departing from the scope of the claims.

The system and the method for removing volatile organic compounds and nitrogen oxides from off-gas is particularly useful for the cleaning of flue gas released by gas turbines used in power generation, or by nitric acid plants.

The catalytic article as disclosed above has both an oxidation function for volatile organic compounds and a reduction function for the removal of nitrogen oxides. Such as catalyst has a dual function and is therefore also referred to as dual function catalyst (DFC). The DFC may partly or completely replace the conventional SCR catalyst installed, for instance, in power plants and nitric acid plants.

Taken together, the catalytic article according to the present invention, i.e. the dual function catalyst (DFC) may partly or completely replace the conventional SCR catalyst installed, for instance, in power plants and nitric acid plants. With respect to partly replacing the SCR, the DFC may be installed upstream or downstream the conventional SCR catalyst. If the DFC is installed upstream of the conventional SCR catalyst, the DFC con-tributes to lower the $NO_2$ to $NO_x$ ratio, provided that carbon monoxide is also present. If, on the other hand, the conventional SCR catalyst is installed upstream of the DFC, said conventional SCR catalyst can reduce $NO_x$ provided ammonia is also present. In this case, the downstream DFC subsequently will decrease the $NO_2$ to $NO_x$ ratio provided that carbon monoxide is present.

BRIEF DESCRIPTION OF THE DRAWINGS

The $\Delta NO_x$ [%] values versus $NH_3/NO_x$ [ppm/ppm] for the various $NO_2$ contents are shown in FIG. 1.

The $NO/NO_x$ [%] values versus $NH_3/NO_x$ [ppm/ppm] for the various $NO_2$ contents are shown in FIG. 2.

EMBODIMENTS

Comparative Example 1: DeNOx Efficiency of a Standard SCR Catalytic Article De-Pending on the $NH_3/NO_x$ Ratio The SCR kinetics of a standard SCR catalyst were tested to examine what happened if the fraction of $NO_2$ in off-gas varied between 0 and 100 mol-%. of total $NO_x$. The standard catalyst was a vanadia-titania-tungsten catalytic article comprising 3 wt.-% $V_2O_5$, 3 wt.-% $WO_3$, 70-80 wt.-% $TiO_2$ and about 15 wt.-% of a silica-alumina binder on a corrugated substrate. The catalyst was free of precious metals or precious metal oxides.

Measurement Conditions:

35 ppmvd $NO_x$, wherein ppmvd stands for "parts per million per volume and dry-based" 10% dry $O_2$ Temperature:

The measurements were performed for 0, 25, 50, 75 and 100% $NO_2$ at 560 F (=293.3° C.) and for 0% $NO_2$ at 700 F (=371.1° C.)

5% $H_2O$
35 Nm/Hr $A_v$

TABLE 1

$\Delta NO_x$ [%] versus $NH_3/NO_x$ [ppm/ppm] for the various $NO_2$ contents

| 0% $NO_2$ $NH_3/NO_x$ [ppm/ppm] | $\Delta NO_x$[%] | 25% $NO_2$ $NH_3/NO_x$ [ppm/ppm] | $\Delta NO_x$[%] | 50% $NO_2$ $NH_3/NO_x$ [ppm/ppm] | $\Delta NO_x$[%] |
|---|---|---|---|---|---|
| 0 | 0 | 0 | 0 | 0 | 0 |
| 0.41 | 34.44 | 0.41 | 37.54 | 0.40 | 34.20 |
| 0.85 | 71.86 | 0.85 | 75.80 | 0.84 | 74.90 |
| 1.28 | 83.45 | 1.26 | 87.17 | 1.27 | 87.23 |
| 1.66 | 85.32 | 1.68 | 88.34 | 1.68 | 88.80 |
| 2.55 | 87.03 | 2.53 | 89.34 | 2.54 | 89.90 |

| 75% $NO_2$ $NH_3/NO_x$ [ppm/ppm] | $\Delta NO_x$[%] | 100% $NO_2$ $NH_3/NO_x$ [ppm/ppm] | $\Delta NO_x$[%] | 0% $NO_2$ at 700 F. (=371.1° C.) $NH_3/NO_x$ [ppm/ppm] | $\Delta NO_x$[%] |
|---|---|---|---|---|---|
| 0 | 0 | 0 | 0 | 0 | 0 |
| 0.41 | 22.96 | 0.41 | 22.34 | 0.41 | 42.41 |
| 0.84 | 43.85 | 0.84 | 28.50 | 0.84 | 77.70 |
| 1.27 | 50.89 | 1.26 | 34.11 | 1.26 | 88.44 |
| 1.68 | 54.10 | 1.69 | 39.32 | 1.69 | 90.50 |
| 2.52 | 60.39 | 2.53 | 44.83 | 2.53 | 91.98 |

Figure 1:
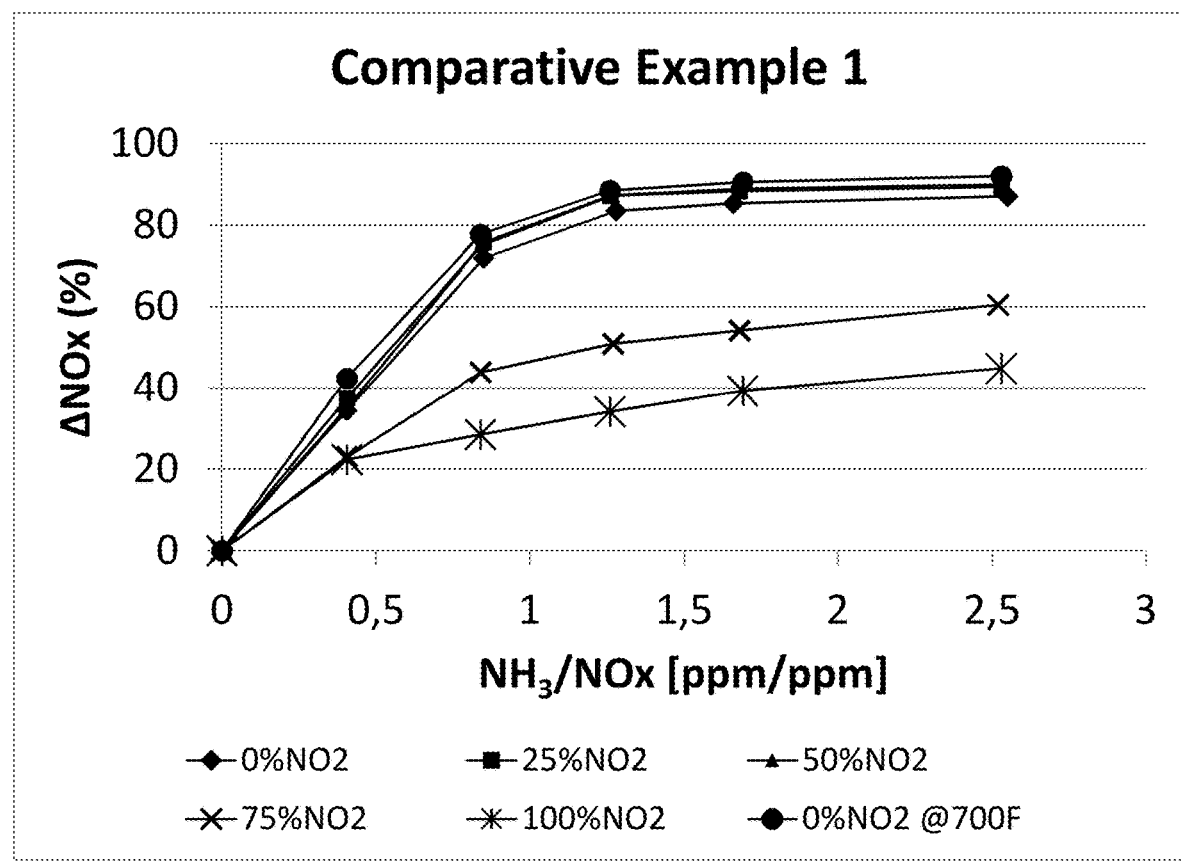

The results are shown in FIG. 1.

TABLE 2

$NO/NO_x$ [%] versus $NH_3/NO_x$ [ppm/ppm] for the various $NO_2$ contents

| 25% $NO_2$ $NH_3/NO_x$ [ppm/ppm] | $NO/NO_x$[%] | 50% $NO_2$ $NH_3/NO_x$ [ppm/ppm] | $NO/NO_x$[%] |
|---|---|---|---|
| 0 | 74.63 | 0 | 51.87 |
| 0.41 | 87.79 | 0.40 | 47.46 |
| 0.85 | 89.15 | 0.84 | 37.15 |
| 1.26 | 82.74 | 1.27 | 30.29 |
| 1.68 | 81.11 | 1.68 | 33.13 |
| 2.53 | 79.13 | 2.54 | 37.01 |

| 75% $NO_2$ $NH_3/NO_x$ [ppm/ppm] | $NO/NO_x$[%] | 100% $NO_2$ $NH_3/NO_x$ [ppm/ppm] | $NO/NO_x$[%] |
|---|---|---|---|
| 0 | 28.85 | 0 | 11.38 |
| 0.41 | 16.22 | 0.41 | 4.87 |
| 0.84 | 6.52 | 0.84 | 4.07 |
| 1.27 | 5.88 | 1.26 | 3.93 |
| 1.68 | 6.04 | 1.69 | 6.65 |
| 2.52 | 6.39 | 2.53 | 5.99 |

Figure 2:
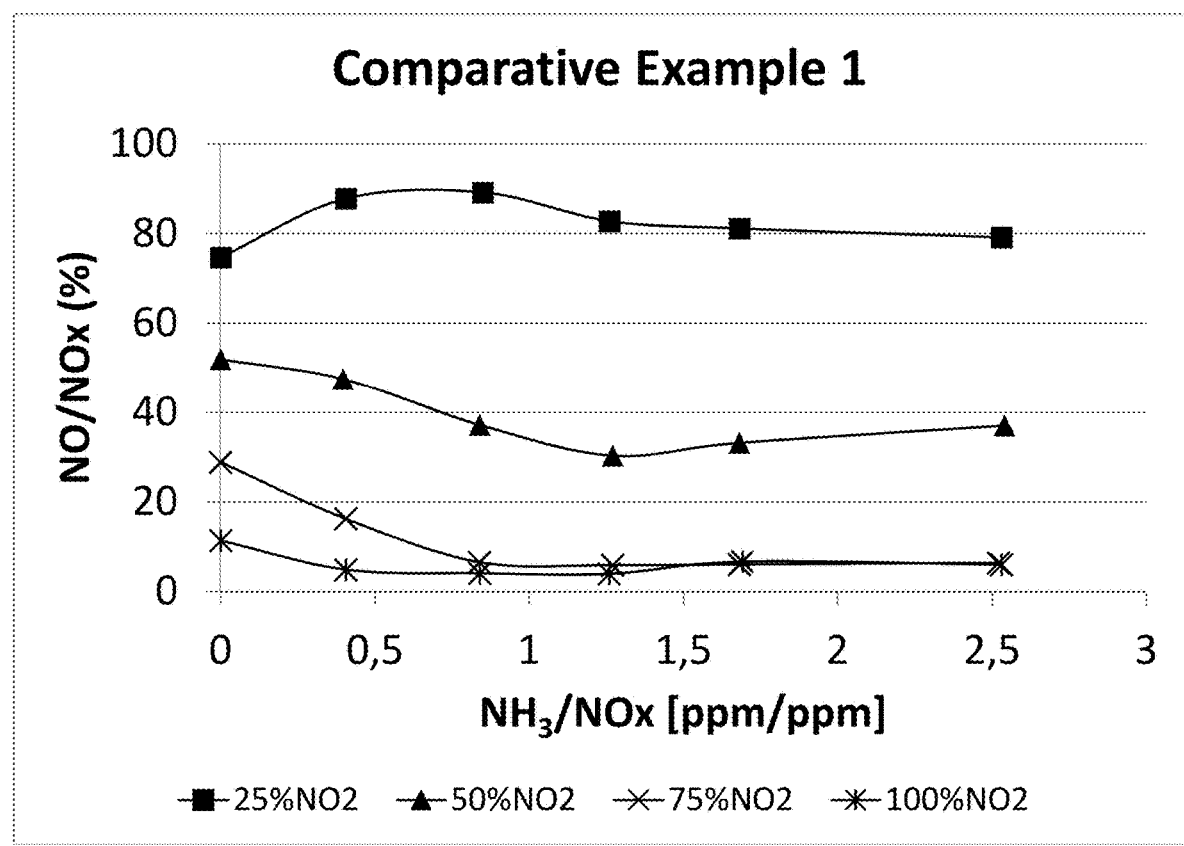

The results are shown in FIG. 2.

Embodiment 1: DeNOx Efficiency of a DFC According to the Present Invention De-Pending on the $NH_3/NO_x$ Ratio The SCR kinetics of a DFC according to the present invention were tested. The DFC comprised 400 ppm Pd, 4 wt.-% $V_2O_5$, 3 wt.-% $WO_3$ and 78 wt.-% $TiO_2$, rest binder ($SiO_2/Al_2O_3$) on a corrugated substrate.

Measurement Conditions:
35 ppmvd $NO_x$
10% dry $O_2$

Temperature:

The measurements were performed for 0 and 100% $NO_2$ at 700 F (=371.1° C.)
5% $H_2O$
35 Nm/Hr $A_v$ The measurements were performed with
a) 0% NO2,
b) 100% NO2
c) 100% NO2 repeat
d) 100% $NO_2$ and 400 ppm CO

TABLE 3

$\Delta NO_x$ [%] versus $NH_3/NO_x$ [ppm/ppm] for the measurements 2a) to 2d)

| 2a) 0% $NO_2$ $NH_3/NO_x$ [ppm/ppm] | $\Delta NO_x$[%] | 2b) 100% $NO_2$ $NH_3/NO_x$ [ppm/ppm] | $\Delta NO_x$[%] |
|---|---|---|---|
| 0 | 0 | 0 | 0 |
| 0.48 | 45.11 | 0.47 | 23.01 |
| 1.00 | 80.20 | 0.94 | 29.16 |
| 1.51 | 85.46 | 1.41 | 31.79 |
| 2.01 | 86.87 | 1.88 | 33.87 |
| 2.99 | 87.86 | 2.81 | 38.14 |

| 2c) 100% $NO_2$ repeat $NH_3/NO_x$ [ppm/ppm] | $\Delta NO_x$[%] | 2d) 100% $NO_2$ + 400 ppm CO $NH_3/NO_x$ [ppm/ppm] | $\Delta NO_x$[%] |
|---|---|---|---|
| 0 | 0 | 0 | 0 |
| 0.47 | 17.49 | 0 | −5.47 |
| 0.94 | 24.71 | 0.46 | 42.62 |
| 1.42 | 28.02 | 0.94 | 78.06 |
| 1.88 | 30.10 | 1.40 | 83.91 |
| 2.83 | 34.51 | 1.88 | 85.33 |
| 3.27 | 36.42 | 2.82 | 86.16 |
| 3.76 | 37.96 | | |
| 4.22 | 39.95 | | |
| 4.69 | 40.59 | | |

Figure 3:
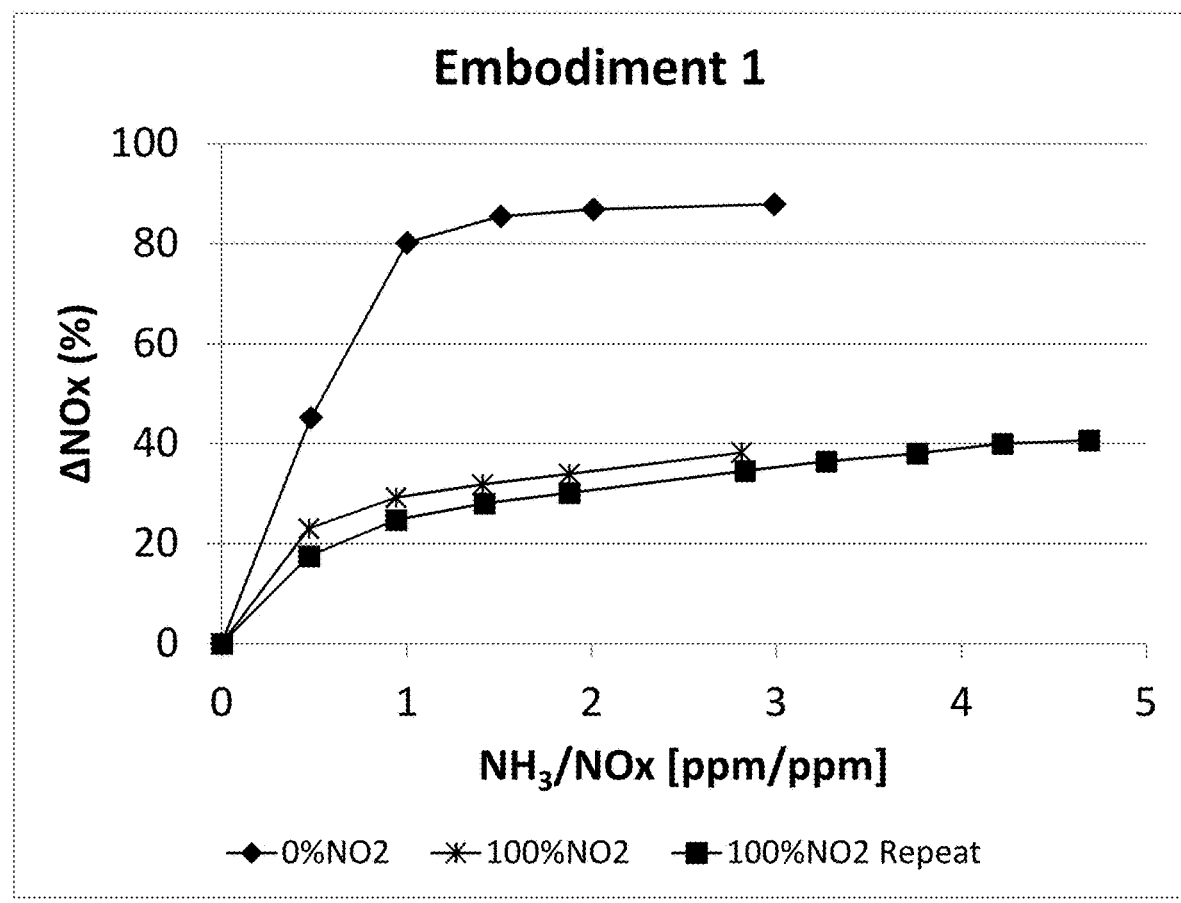
FIG. 3 shows $\Delta NO_x$ [%] versus $NH_3/NO_x$ for measurements 2a), 2b) and 2c).
Figure 4:
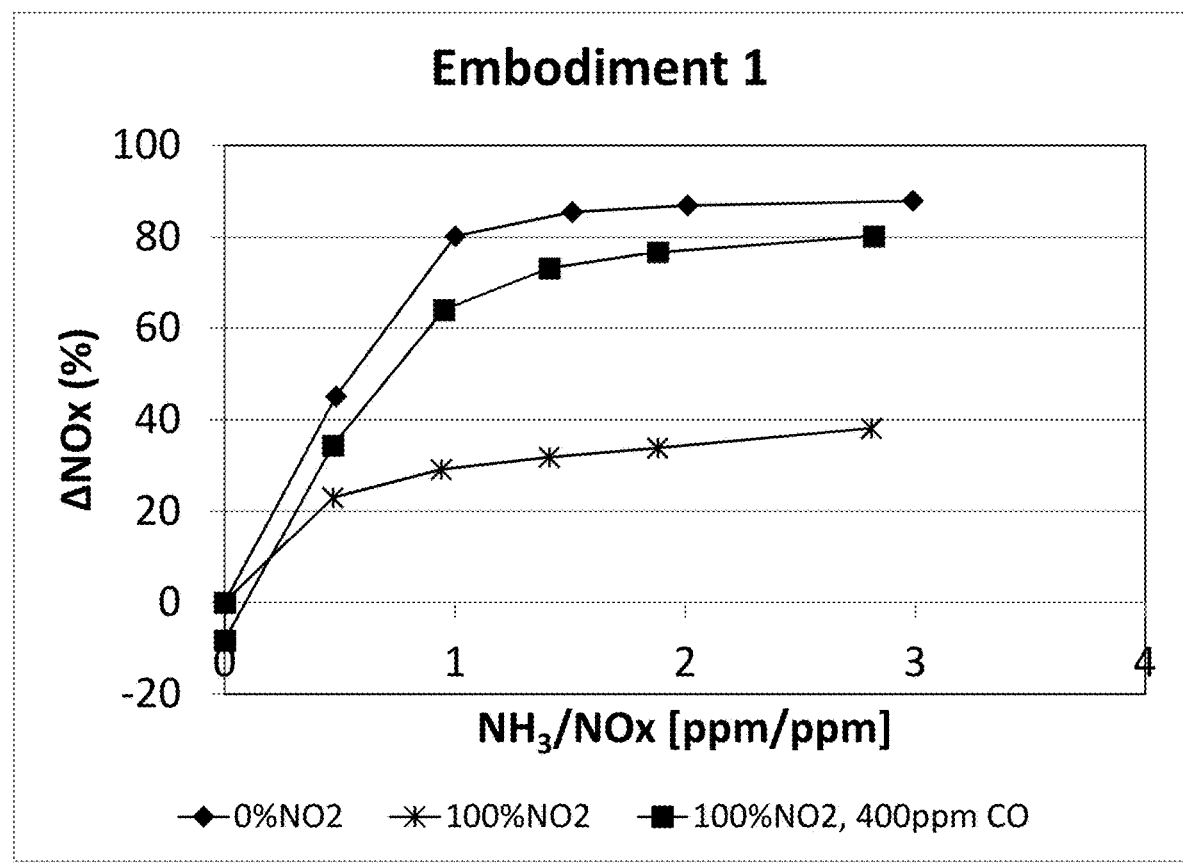
FIG. 4 shows $\Delta NO_x$ [%] versus $NH_3/NO_x$ for measurements 2a), 2b) and 2d).

The results for 2a), 2b) and 2c) and for 2a), 2b) and 2d), respectively, are shown in FIGS. 3 and 4.

The negative value for $\Delta NO_x$ during in measurement 2d) is due to NO production across the catalyst while CO is present.

Figure 5:
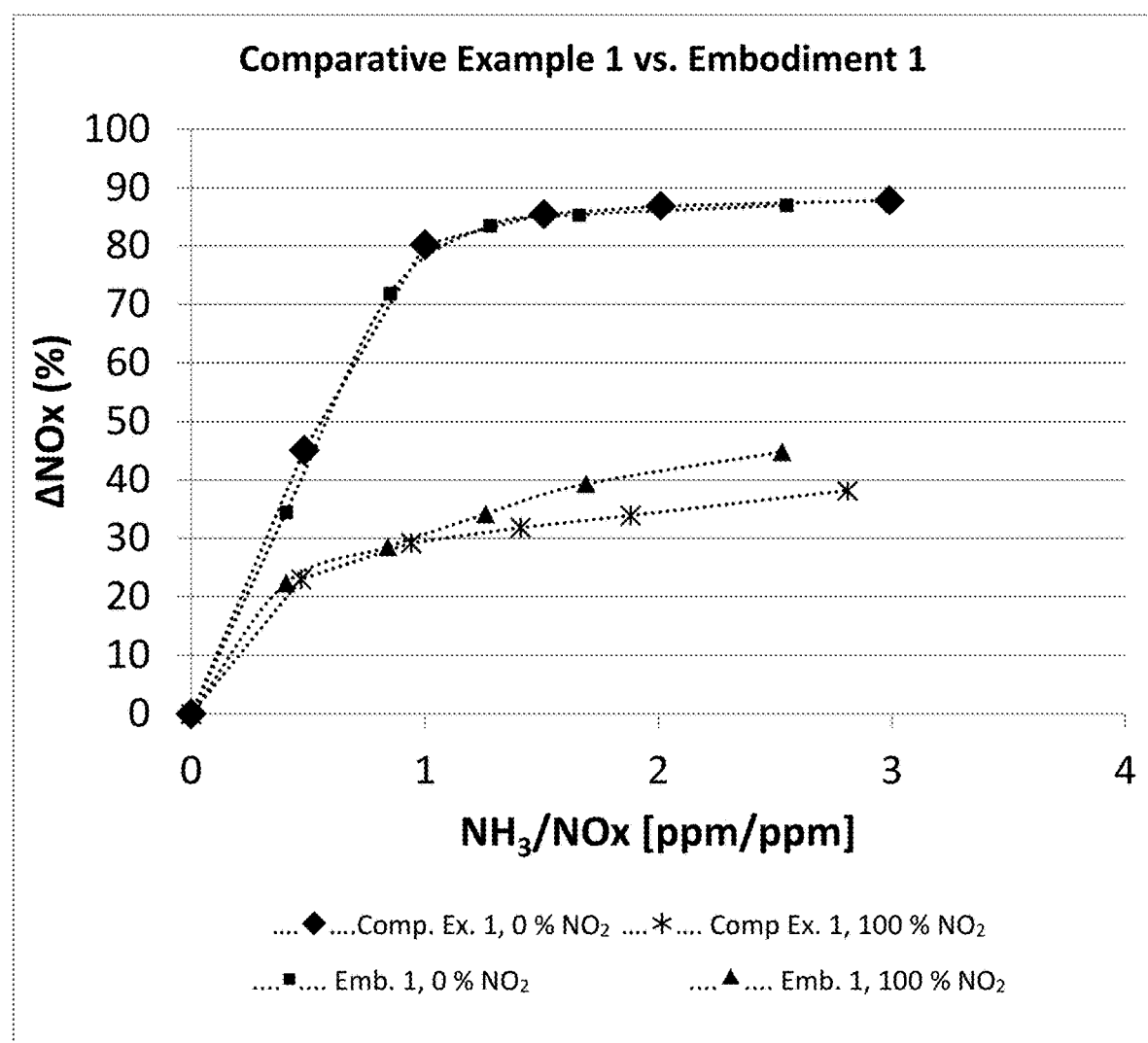
FIG. 5 shows a comparison for $\Delta NO_x$ versus $NH_3/NO_x$ for Comparative Example 1 and Embodiment 1 at 0% and 100% $NO_2$, respectively, is shown in FIG. 5.

A comparison for $\Delta NO_x$ versus $NH_3/NO_x$ for Comparative Example 1 and Embodiment 1 at 0% and 100% $NO_2$, respectively, is shown in FIG. 5.

The invention claimed is:

1. A system for the removal of volatile organic compounds, carbon monoxide and nitrogen oxides from off-gas comprising
   a) a source of ammonia
   b) means for introducing ammonia into a catalytic article having an SCR functionality;
   c) a catalytic article having both an oxidation and an SCR functionality, the catalytic article comprising
      a catalyst substrate and a catalyst composition comprising at least one platinum group metal and/or at least one platinum group metal oxide, at least one oxide of titanium, at least one oxide of vanadium, and 0.001 to 10 wt.-% of at least one oxide of tungsten, calculated as $WO_3$ and based on the total weight of the catalyst article,
      wherein the washcoat is located in and/or on the walls of the catalyst substrate,
   d) means for measuring the amount of $NO_x$ and/or the ammonia slip between the outlet end of the catalytic article and a channel through which the off-gas is exhausted or at the channel, e) at least one carbon monoxide source, and f) means for introducing carbon monoxide into the catalytic article.

2. The system according to claim 1, wherein the source of ammonia is selected from anhydrous ammonia, aqueous ammonia or an ammonium precursor selected from an aqueous urea solution, an aqueous ammonium formate solution, and an aqueous ammonium carbamate solution, and mixtures thereof.

3. The system according to claim 1, wherein the catalyst substrate is selected from flow-through substrates, wall-flow substrates, corrugated substrates, ceramic candle filters, bag filters, or catalyst pellets.

4. The system according to claim 1, wherein the means for introducing ammonia or an aqueous ammonia precursor into the off-gas is a means for introducing anhydrous ammonia.

5. The system according to claim 1, wherein the catalyst substrate is a corrugated substrate, and the catalyst composition comprises 50 to 10,000 ppmw (parts per million per weight) of at least one platinum group metal calculated as the pure precious metal and based on the total weight of the catalytic article, wherein the platinum group metal is palladium, and 60 to 90 wt.-% of at least one oxide of titanium, calculated as $TiO_2$ and based on the total weight of the catalytic article, wherein the at least one oxide of titanium is titanium dioxide, and 0.1 to 17 wt.-% of at least one oxide of vanadium, calculated as $V_2O_5$ and based on the total weight of the catalytic article, wherein the at least one oxide of vanadium is vanadium pentoxide, and wherein the total weight of the catalytic article is the sum of the amounts of the at least one platinum group metal, the amount of the at least one oxide of titanium, the amount of the at least one oxide of vanadium, and the amount of the catalyst substrate.

6. The system according to claim 1, wherein the catalytic article having both an oxidation and an SCR functionality is the only catalytic article having an SCR functionality, and wherein the means for introducing ammonia are located directly upstream of said catalytic article.

7. The system according to claim 1, wherein an SCR catalytic article is present upstream of the catalytic article having both an oxidation and an SCR functionality, and wherein the SCR catalytic article only has a selective catalytic reduction functionality, but no oxidation functionality, and wherein the means for introducing ammonia are located directly upstream of the SCR catalytic article.

8. The system according to claim 1, wherein an SCR catalytic article is present downstream of the catalytic article having both an oxidation and an SCR functionality, and wherein the SCR catalytic article only has a selective catalytic reduction functionality, but no oxidation functionality, and wherein the means for introducing ammonia according to b) are either located upstream the DFC or between the DFC and the SCR catalytic article.

9. The system according to claim 1, wherein the at least one carbon monoxide source is selected from uncleaned exhaust gas released by a power plant and/or hydrocarbons and/or carbon monoxide from external sources.

10. The system according to claim 1, said system additionally comprising means for measuring the amount of CO emitted between the outlet end of the catalytic article and the channel or at the channel.

11. A method for reducing the effect of $NO_2$ present in an off-gas on SCR catalysis of nitrogen oxides in the off-gas, comprising the steps of a) introducing ammonia into the off-gas, b) introducing the off-gas into a catalytic article having both an oxidation and an reduction functionality, the catalytic article comprising a catalyst substrate and a catalyst composition comprising at least one platinum group metal and/or at least one platinum group metal oxide, at least one oxide of titanium and at least one oxide of vanadium, c) measuring the amount of $NO_x$ and/or the ammonia slip between the outlet end of the catalytic article and a channel through which the off-gas is exhausted or at the channel, d) introducing carbon monoxide into the catalytic article to decrease the amount of $NO_x$ and/or the ammonia slip in the channel measured under step c), and e) measuring the amount of $NO_x$ and/or the ammonia slip between the outlet end of the catalytic article and the channel or at the channel after the introduction of carbon monoxide.

12. The method according to claim 11, wherein the source of ammonia is selected from anhydrous ammonia, aqueous ammonia or an ammonium precursor selected from an aqueous urea solution, an aqueous ammonium formate solution, and an aqueous ammonium carbamate solution, and mixtures thereof.

13. The method according to claim 11, wherein the catalyst substrate in step b) is selected from flow-through substrates, wall-flow substrates, corrugated substrates, ceramic candle filters, bag filters, or catalyst pellets.

14. The method according to claim 11, wherein steps c) and e) additionally comprise measuring the amount of CO emitted between the outlet end of the catalytic article and the channel or at the channel.

15. The method according to claim 11, wherein the catalytic article having both an oxidation and an SCR functionality is the only catalytic article having an SCR functionality, and wherein the means for introducing ammonia are located directly upstream of said catalytic article.

16. The method according to claim 11, wherein an SCR catalytic article is present upstream of the catalytic article having both an oxidation and an SCR functionality, and wherein the SCR catalytic article only has a selective catalytic reduction functionality, but no oxidation functionality, and wherein the means for introducing ammonia are located directly upstream of the SCR catalytic article.

17. The method according to claim 11, wherein an SCR catalytic article is present downstream of the catalytic article having both an oxidation and an SCR functionality, and wherein the SCR catalytic article only has a selective catalytic reduction functionality, but no oxidation functionality, and wherein the means for introducing ammonia according to b) are either located upstream the DFC or between the DFC and the SCR catalytic article.

18. A method for the cleaning of flue gas released by gas turbines or by nitric acid plants, which comprises using the system according to claim 1.

19. A method for the cleaning of flue gas released by gas turbines or by nitric acid plants, which comprises using the method according to claim 11.

20. The method according to claim 11, wherein the amount of $NO_2$ in the off-gas exceeds 50% of the total $NO_x$ of the off-gas.

* * * * *